US010742582B2

(12) United States Patent
Tian

(10) Patent No.: US 10,742,582 B2
(45) Date of Patent: Aug. 11, 2020

(54) LAUNCHING A CLIENT APPLICATION BASED ON A MESSAGE

(71) Applicant: Alibaba Group Holding Limited, George Town (KY)

(72) Inventor: Ruijun Tian, Beijing (CN)

(73) Assignee: Alibaba Group Holding Limited (KY)

( * ) Notice: Subject to any disclaimer, the term of this patent is extended or adjusted under 35 U.S.C. 154(b) by 501 days.

(21) Appl. No.: 14/558,307

(22) Filed: Dec. 2, 2014

(65) Prior Publication Data

US 2015/0163186 A1 Jun. 11, 2015

(30) Foreign Application Priority Data

Dec. 11, 2013 (CN) .......................... 2013 1 0677054

(51) Int. Cl.
*G06F 15/16* (2006.01)
*H04N 7/173* (2011.01)
*H04L 12/58* (2006.01)
*G06F 9/445* (2018.01)
*H04L 29/08* (2006.01)
*G06F 16/51* (2019.01)
*G06F 16/9535* (2019.01)
*G06F 16/335* (2019.01)

(52) U.S. Cl.
CPC .............. *H04L 51/18* (2013.01); *G06F 9/445* (2013.01); *H04L 67/10* (2013.01); *G06F 16/335* (2019.01); *G06F 16/51* (2019.01); *G06F 16/9535* (2019.01); *H04L 51/12* (2013.01); *H04L 67/16* (2013.01)

(58) Field of Classification Search
CPC . G06F 17/21; G06F 17/30867; G06Q 10/107; G06Q 20/102; G06Q 20/32; H04L 12/585; H04W 4/16
See application file for complete search history.

(56) References Cited

U.S. PATENT DOCUMENTS

| 6,070,150 | A | 5/2000 | Remington et al. |
| 6,934,738 | B1 | 8/2005 | Furusawa et al. |
| 7,216,349 | B2 | 5/2007 | Chen et al. |
| 7,463,619 | B1 | 12/2008 | Prokop et al. |
| 8,155,669 | B2 | 4/2012 | Ziskind et al. |
| 8,606,561 | B2 | 12/2013 | Takeuchi |
| 8,744,424 | B2 | 6/2014 | Kamiya |
| 8,843,616 | B2 | 9/2014 | Ochoa et al. |
| 9,843,908 | B2 | 12/2017 | Wang |
| 2003/0131226 | A1* | 7/2003 | Spencer .................... G06F 8/61 713/100 |

(Continued)

FOREIGN PATENT DOCUMENTS

| CN | 102609189 | 7/2012 |
| CN | 103037072 | 4/2013 |

(Continued)

*Primary Examiner* — Nicholas R Taylor
*Assistant Examiner* — Ho T Shiu
(74) *Attorney, Agent, or Firm* — Van Pelt, Yi & James LLP

(57) ABSTRACT

Launching a client application based on a message is disclosed, including: receiving a message at a client device; using information included in the message to identify a client application that corresponds to the message; and automatically launching the client application, wherein the client application is configured to receive at least some of the information included in the message.

20 Claims, 9 Drawing Sheets

(56) References Cited

U.S. PATENT DOCUMENTS

| | | | |
|---|---|---|---|
| 2008/0004053 A1* | 1/2008 | Kim .................... | H04L 12/585 455/466 |
| 2008/0167000 A1 | 7/2008 | Wentker et al. | |
| 2008/0222249 A1 | 9/2008 | Tanaka | |
| 2009/0274384 A1* | 11/2009 | Jakobovits ............ | G06F 19/321 382/254 |
| 2009/0276497 A1* | 11/2009 | Gupta .................. | G06Q 10/107 709/206 |
| 2010/0312836 A1* | 12/2010 | Serr ...................... | G06Q 10/00 709/206 |
| 2012/0011150 A1* | 1/2012 | Swaminathan ... | G06F 17/30699 707/770 |

FOREIGN PATENT DOCUMENTS

| | | | | |
|---|---|---|---|---|
| EP | 1463348 | 9/2004 | | |
| EP | 1513063 | 3/2005 | | |
| JP | 2000200225 | 7/2000 | | |
| JP | 2003015878 A | 1/2003 | | |
| WO | PCT-2001022680 A2 | 3/2001 | | |
| WO | WO 2001022680 A2 * | 3/2001 | ............ | H04L 12/28 |
| WO | 2005053335 | 6/2005 | | |

* cited by examiner

LAUNCHING A CLIENT APPLICATION BASED ON A MESSAGE

CROSS REFERENCE TO OTHER APPLICATIONS

This application claims priority to People's Republic of China Patent Application No. 201310677054.7 entitled A MESSAGE-BASED METHOD AND DEVICE FOR WAKING UP CLIENT APPLICATIONS, filed Dec. 11, 2013 which is incorporated herein by reference for all purposes.

FIELD OF THE INVENTION

The present application relates to the field of Internet technology. In particular, the present application relates to techniques for automatically launching a client application.

BACKGROUND OF THE INVENTION

As mobile Internet technology develops, more and more users are choosing to use quick and convenient client applications on their mobile phones to perform common tasks. To use a client application, a person generally needs to manually select to open the client application. For example, if a user needs to use an application to send data to a server, the user would need to first open the application and select the appropriate function with respect to the application to use. Moreover, the user sometimes also needs to input some information into the application. For example, when a mobile phone or other such terminal receives a message stating that a task needs to be performed (e.g., the message may state that the user owes a certain amount of money to a vendor), the user often needs to manually duplicate or record the identification code or other such information from the message in order to input the information into an associated application, through which the task may be performed. Moreover, the user would also need to separately locate and manually open the associated application on the terminal in order to manually input the information that was included in the message. Sometimes, in addition to inputting the information included in the message into the application, the user may also need to manually input his or her own information (e.g., credentials) before he or she can make a submission with the application. When there is a relatively large amount of information from the message that needs to be input into the application, the user often may need to switch out of the application and reopen the source (e.g., an email or messaging application) at which the message was received and displayed. However, having to switch back and forth between multiple applications at a terminal in order to input information in one application may be inefficient and inconvenient for the user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of launching a client application based on a message are described herein. A message is received at a client device. The information included in the message is used to identify a client application that corresponds to the message. In various embodiments, the identified client application is already installed at the client device. The client application is automatically launched. The launched client application is configured to receive at least some of the information included in the message. The client application uses the information that it has received to perform a service associated with the client application.

Figure 1:
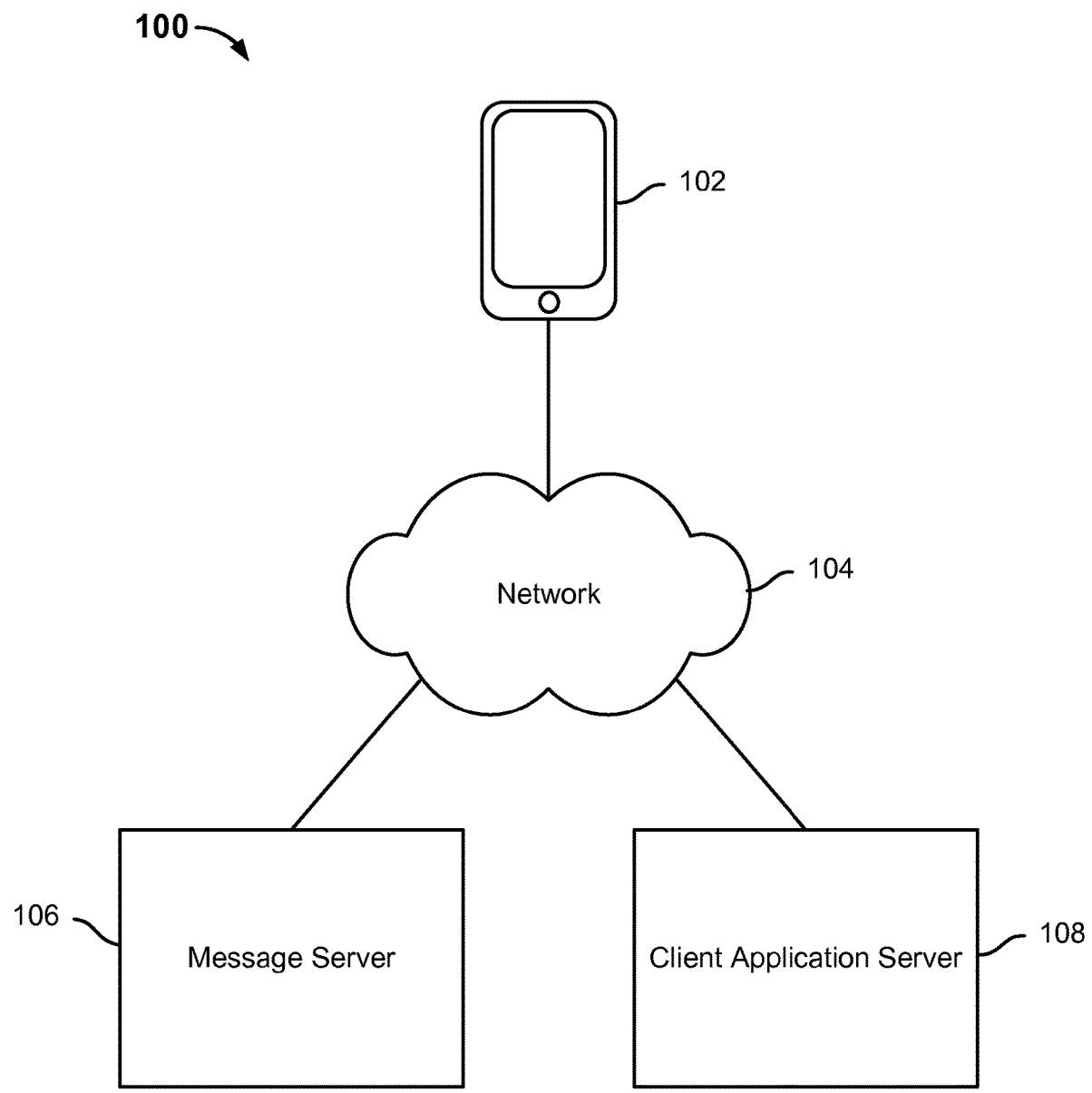
FIG. 1 is a diagram showing an embodiment of a system for launching a client application based on a received message.

FIG. 1 is a diagram showing an embodiment of a system for launching a client application based on a received message. System 100 includes client device 102, network 104, message server 106, and client application server 108. Network 104 includes one or more of high-speed data networks and/or telecommunications networks. Client device 102 communicates over network 104 to message server 106 and client application server 108.

While client device 102 is shown to be a smart phone in the example of FIG. 1, other examples of client device 102 include a mobile device, a tablet device, a desktop computer, a laptop computer, and/or any computing device. Various client applications are installed at client device 102. For example, a client application can be configured to provide one or more different types of service.

In various embodiments, message server 106 is configured to send a message to client device 102. For example, the message may comprise a short message service (SMS) message or an instant message that is received at an instant messaging application executing at client device 102. In some embodiments, the message may include one or more of text, images, uniform resource locators (URLS), and/or other media. In some embodiments, the message comprises an alert message that message server 106 is configured to send on behalf of a service with which a user associated with client device 102 is associated. For example, the service associated with the alert message comprises a banking service with which the user of client device 102 has a credit card. The alert message sent to client device 102 may indicate that the payment of the user of client device 102's outstanding balance on the credit card is due soon.

As will be described in further detail below, in response to receiving the message at client device 102, the message is analyzed and a client application that has been installed at client device 102 and that corresponds to the message is launched. In some embodiments, an operating system executing at client device 102 is configured to analyze the message to determine the corresponding client application to launch. For example, if the received message comprises an alert message from the bank and that indicates that the payment of the user of client device 102's outstanding balance on the credit card is due soon, then the client application that is identified to correspond to that message may comprise a client application that is configured to perform payments. The identified client application is automatically launched. As will be described in further detail below, the launched client application is automatically prepopulated with at least some information that is extracted from the message. For example, if the payment client application is launched in response to the alert message from the bank, then the payment client application can be prepopulated with information extracted from the message, including, for instance, the outstanding balance on the credit card bill and the identification information associated with the payee (e.g., the bank). The user may review and/or edit the information that was automatically input into the client application before selecting a selectable element to cause the information input into the client application to be sent from client device 102 to client application server 108, at which the payment or other type of data exchange can be completed.

By enabling an appropriate client application installed at a client device to automatically launch in response to a receipt of a message at the client device as described in embodiments disclosed herein, the user of the client device is spared from having to manually exit from a display of a received message, manually select the appropriate client application, and/or manually input the correct and relevant information from the message into the client application. Thus, the flow of completing a task based on a received message is greatly simplified for the user.

Figure 2:
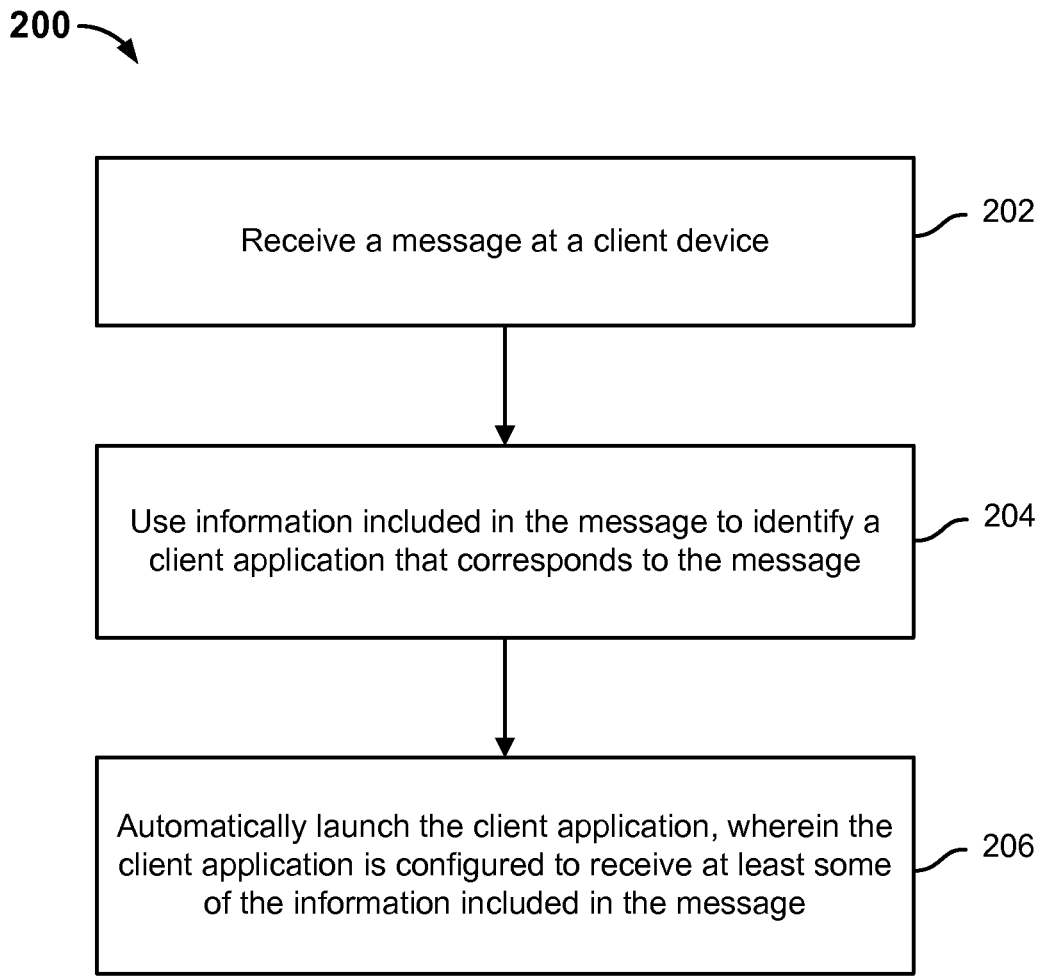
FIG. 2 is a flow diagram showing an embodiment of a process of launching a client application based on a received message.

FIG. 2 is a flow diagram showing an embodiment of a process of launching a client application based on a received message. In some embodiments, process 200 is implemented at system 100 of FIG. 1.

At 202, a message is received at a client device.

A message is received at the client device via a messaging application executing at the client device. For example, the message may comprise an SMS message that is received at an SMS application executing at the client device. Or, for example, the message may comprise an instant message that is received at an instant messaging application executing at the client device. The message may include one or more of text, images, uniform resource locators (URLS), a sender identification code, and/or other media. The sender of the message may comprise a phone number, a sender identification code, or some other type of identifying information. Specifically, for example, the message may include an identification code (e.g., a phone number or other form of identifying code) associated with the sender, text content, and/or geographic location information associated with the sender. The types of information included in the message as described herein are merely examples and other types of information may be included in the message as well.

In some embodiments, the user associated with the client device may be a subscriber to messages from various vendors, services, and/or utility companies. For example, the user may subscribe to receive alert messages from the user's bank that indicate when the user's outstanding balance on a credit card is due.

At 204, information included in the message is used to identify a client application that corresponds to the message.

The information included in the message may be parsed and used to identify a corresponding client application that has been installed at the client device. In various embodiments, a "client application" refers to an application installed at the client device. A client application is configured to communicate with a server and/or cloud service and provide one or more services associated with the server and/or cloud service. For example, the client application may provide a payment service in which a user can input information regarding making a payment to a payee and the server associated with the payment service will complete the payment from an account associated with the user of the client device to an account of the specified payee. In some other embodiments, a client application comprises an application installed at a server.

A client application can be configured provide one or more different types of service. A type of service provided by a client application may sometimes be referred to as a "sub-application." One example client application that is configured to perform data exchanges with a third party payment platform may be configured to perform the following types of services (sub-applications) related to payment: transfer funds between accounts, perform a bill payment, perform a credit card payment, and transfer funds into a prepayment account (e.g., associated with a service, such as a phone account). A client application that is configured to perform data exchanges with a third party payment platform is only an example of a client application and other types of client applications may be used in actual implementations as well.

The information included in the message is used as the basis for determining a client application installed at the client device that corresponds to the message. For example, the text content of a message is used to determine which one of the client applications installed on the client device to which the received message corresponds. For example, in a scenario in which a user uses a phone for which incurred charges are paid from a prepaid account, the user would need to maintain a certain balance of credit/funds in the prepaid account in order to continue to use the phone. The user may subscribe to receive alert messages indicating a low balance in his or her account from the phone company at a certain registered client device. As a result, when the user's balance in his or her account with the phone company falls between a threshold balance value, for example, the user may receive an alert message at his or her registered client device that indicates a low balance in the user's phone account balance. As will be described in further detail below, the information included in the alert message may be automatically analyzed and used to determine a corresponding client application installed on the client device that can be used to perform a phone account balance recharging service. In some embodiments, one or both of the text content and the identifying information associated with the message can be used to determine the client application corresponding to the message.

At 206, the client application is automatically launched, wherein the client application is configured to receive at least some of the information included in the message.

As will be described in further detail below, once the client application corresponding to the message is identified, the client application is automatically launched at the client device. In various embodiments, "launching" a client application refers to opening/executing an unopened client application at the client device or continuing to execute a client application that was already opened/executed (but was not currently in use). In various embodiments in which the client application is configured to perform a data exchange with a server to perform a service, the launched client application is caused to display a form at a page, in which relevant information to send to the server is to be received. At least a portion of the information included in the message and/or other contextual information associated with the client device and/or the user of the client device may be determined and used to prepopulate at least a portion of the input fields of the form. For example, returning to the example in which the client device receives an alert message that indicates a low balance in the user's phone account balance, a corresponding client application installed on the client device that can be used to perform a phone account balance recharging service can be launched, and a form at a page associated with the client application for sending data to the server to perform the phone account balance recharging service can be at least partially prepopulated with at least some information that was extracted from the alert message and/or stored by the client device. For example, the prepopulated form of the client application can be presented for the user at the client device and the user can select to submit the form to send the input data to the server. This way, upon receiving the alert message, the user does not need to manually identify a relevant client application that has been installed at the client device to use to perform a task associated with the alert message or need to manually determine the data to input into the relevant client application. Instead, the correct client application is automatically identified, launched, and prepopulated with information from a message that was received at a client device on behalf of the user of the client device.

In some embodiments, process 200 can be implemented at least in part by the operating system of the client device. In some embodiments, process 200 can be implemented at least in part by a computer code and/or logic sent to the client device by a server.

Figure 3:
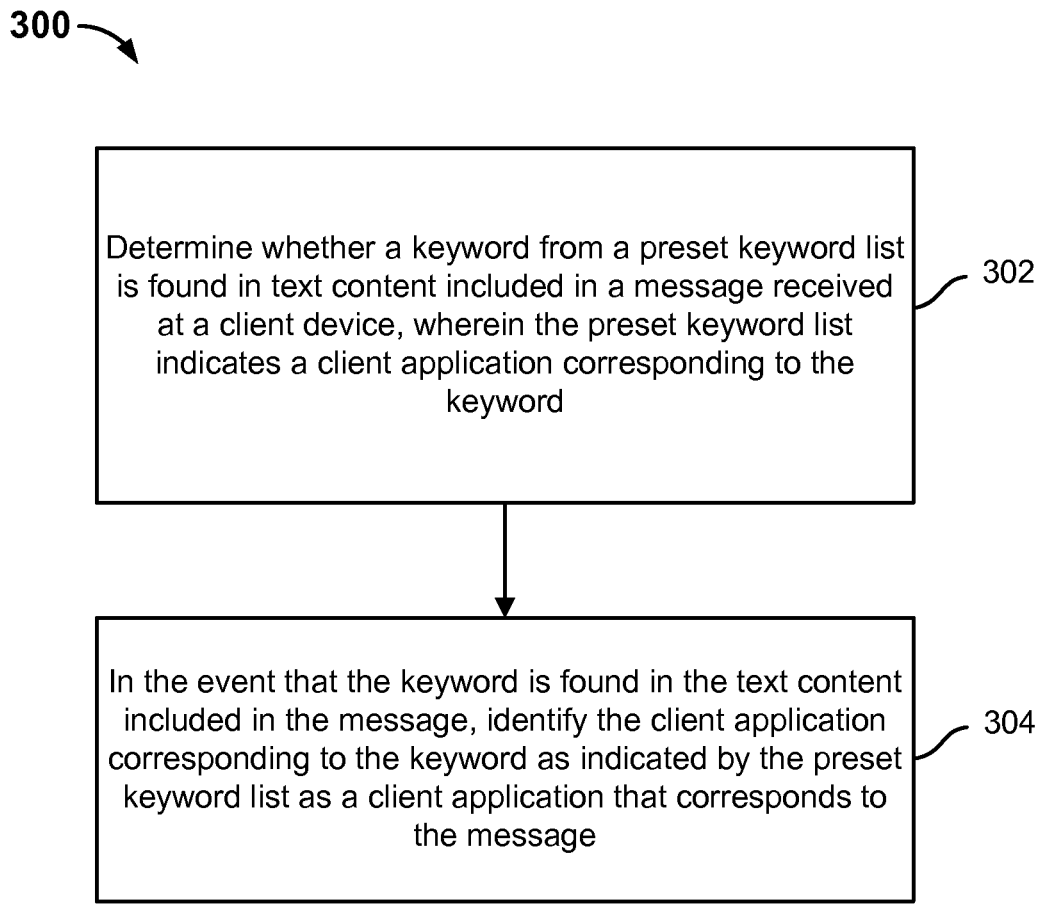
FIG. 3 is a flow diagram showing an example of a process for using information included in a message to identify a client application that corresponds to the message.
Figure 4:
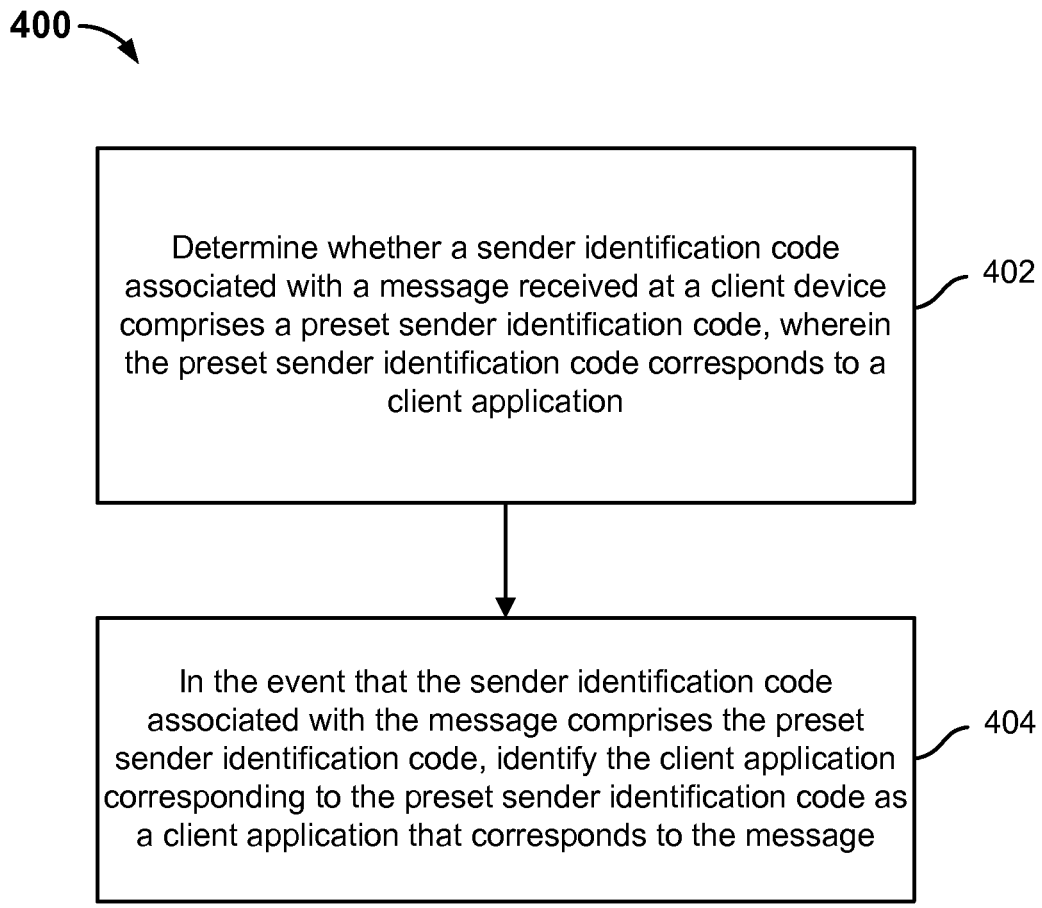
FIG. 4 is a flow diagram showing an example of a process for using information included in a message to identify a client application that corresponds to the message.
Figure 5:
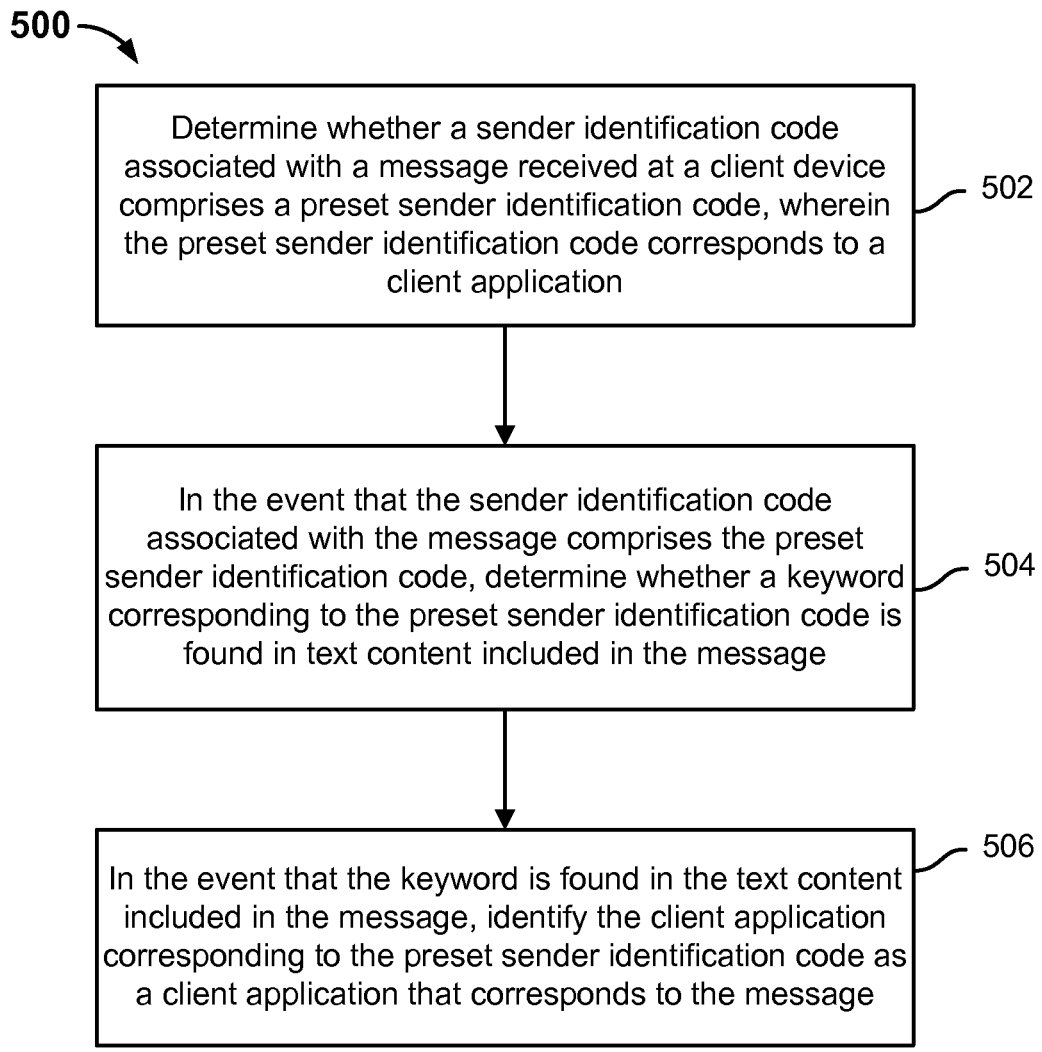
FIG. 5 is a flow diagram showing an example of a process for using information included in a message to identify a client application that corresponds to the message.

FIGS. 3, 4, and 5, below, each describes an example of a process that can be implemented to use information included in a message to identify a client application that corresponds to the message.

FIG. 3 is a flow diagram showing an example of a process for using information included in a message to identify a client application that corresponds to the message. In some embodiments, process 300 is implemented at system 100 of FIG. 1. In some embodiments, step 204 of process 200 of FIG. 2 can be implemented at least in part using process 300.

At 302, it is determined whether a keyword from a preset keyword list is found in text content included in a message received at a client device, wherein the preset keyword list indicates a client application corresponding to the keyword.

In some embodiments, each keyword included in a preset keyword list is compared to the text content of the message to determine whether that keyword can be found in the text content of the message. The preset keyword list is predetermined and includes various keywords and one or more client applications that correspond to each such keyword. Different keywords may correspond to the same client application. One client application may also correspond to different keywords. In some embodiments, the preset keyword list was determined at a server and sent from the server to the client device, where it is stored. In some embodiments, the preset keyword list is configured by a user at a client device and stored at the client device. In some embodiments, process 300 is implemented at least in part by the operating system running at the client device and so the preset keyword list is stored at the client device in a manner that is accessible by the operating system.

In some embodiments, the client applications included in the preset keyword list are checked against the client applications that have actually been installed at the client device and for any client application that is indicated in the preset keyword list that has not been installed at the client device, the corresponding entry in the preset keyword list including that client application and a corresponding keyword is removed from the preset keyword list. In some embodiments, the client applications included in the preset keyword list are checked against the client applications that have actually been installed at the client device and for any client application that is indicated in the preset keyword list that has not been installed at the client device, a message is presented at the client device to ask if the user would like to install the missing client application at the client device. This way, the preset keyword list is ensured to include only client applications that have actually been installed at the client device.

An example client application that is one that is configured to perform payments can be used to carry out account transfers, bill payments, credit card payments, phone account recharging, and so on. Thus, for example, the keywords that are set to correspond with this client application may include one or more of the following keywords: "recharge," "balance," "bill payment," "water bill," "electric bill," "fees owed," "bill," and "repayment."

At 304, in the event that the keyword is found in the text content included in the message, the client application corresponding to the keyword as indicated by the preset keyword list is identified as a client application that corresponds to the message.

If the keyword from the preset keyword list is found in the text content of the message, then the client application as indicated by the preset keyword list as corresponding to that keyword is identified as the client application that corresponds to the message.

For example, a client device receives a message sent from the identification code 10086. The text of this message reads "Insufficient balance alert: Your telephone account balance is now below 10 dollars. Please promptly recharge to ensure normal use." For example, using step 302 of process 300, each keyword can be acquired (e.g., in a specified order) from the preset keyword list, and the text content of the message can be checked to determine whether the keyword can be found in the text content of the message. In the current example, the result of checking is: the message includes the keywords "balance" and "recharge" from the preset keyword list. Therefore, using step 304 of process 300, the client application that corresponds to the keywords "balance" and "recharge" according to the preset keyword list is determined as corresponding to the message. For example, in the preset keyword list, the client application that corresponds to both the keywords "balance" and "recharge" is the "Alipay" client application.

In the event that the text content of a message includes more than one keyword from the preset keyword list that corresponds to the same client application, in some embodiments, it is determined whether the total number of keywords that are found in the message text content and that correspond to the same client application exceeds a predetermined threshold value. If the quantity of keywords that are found in the message text content and that correspond to the same client application does exceed the predetermined threshold value, then that client application is identified as the client application that corresponds to the message.

In the event that the text content of a message includes more than multiple keywords from the preset keyword list that correspond to multiple different client applications, in some embodiments, a total number of keywords that are found in the message text content and that correspond to each client application is determined. Then, it is determined that the client application associated with the greatest number of total keywords is identified as the client application that corresponds to the message.

In the event that the keyword(s) of the preset keyword list that is found in the text content of the message corresponds to multiple different client applications, then the logical relationships between the keywords can be analyzed to identify one of the client applications as the client application that corresponds to the message. For example, assume that the message includes the keywords "balance" and "recharge" from the preset keyword list. In the current example, "balance" might correspond to the "Alipay" client application and to the "Stocks" client application. The client application that corresponds to the message can be identified by assessing the logical relationships of the keywords of the preset keyword list that are found in the text content of the message. The logical relationship between keywords may include: the combination of one keyword with one or more other keywords, the sequence of one keyword relative to one or more other keywords, for example. These logical relationships can be preset by an administrator or can be obtained by gathering samples and establishing a model. For example, when both the keywords "balance" and "recharge" of the preset keyword list appear in the text content of a message, a predetermined logical relationship indicates that the keywords "balance" and "recharge" identify that the client application corresponding to the message is the "Alipay" client application. In another example, when both the keywords "balance" and "open account" of the preset keyword list appear in the text content of a message, a predetermined logical relationship indicates that the keywords "balance" and "open account" identify that the client application corresponding to the message is the "Stocks" client application.

FIG. 4 is a flow diagram showing an example of a process for using information included in a message to identify a client application that corresponds to the message. In some embodiments, process 400 is implemented at system 100 of FIG. 1. In some embodiments, step 204 of process 200 of FIG. 2 can be implemented at least in part using process 400.

In some embodiments, process 400 can be implemented alternatively to process 300 of FIG. 3.

At 402, it is determined whether a sender identification code associated with a message received at a client device comprises a preset sender identification code, wherein the preset sender identification code corresponds to a client application.

It is determined whether a sender identification code of the message is one of potentially multiple preset sender identification codes. Put another way, a query is made to determine whether the sender of the message is a sender which has been preset to automatically launch a corresponding client application at a client device on the basis of a message having been received from this same sender at the client device. In various embodiments, a "sender identification code" of a message may comprise a number associated with the source (e.g., phone number or email address) of the message and/or a value that is found in the message. In various embodiments, a preset sender identification code list is predetermined. The preset sender identification code list comprises one or more preset sender identification codes and also indicates a client application that corresponds to each. By looking up whether the sender identification code associated with the message is found within this preset sender identification code list, it is possible to determine whether the sender identification code associated with the message is a preset sender identification code. In some embodiments, the preset sender identification code list is received at the client device from the server and then stored at the client device. In some embodiments, process 400 is implemented at least in part by the operating system running at the client device and so the preset sender identification code list is stored at the client device in a manner that is accessible by the operating system.

In some embodiments, the client applications included in the preset sender identification code list are checked against the client applications that have actually been installed at the client device and for any client application that is indicated in the preset sender identification code list that has not been installed at the client device, the corresponding entry in the preset sender identification code list including that client application and a corresponding keyword is removed from the preset sender identification code list. In some embodiments, the client applications included in the preset sender identification code list are checked against the client applications that have actually been installed at the client device and for any client application that is indicated in the preset sender identification code list that has not been installed at the client device, a message is presented at the client device to ask if the user would like to install the missing client application at the client device. This way, the preset sender identification code list is ensured to include only client applications that have been installed at the client device.

At 404, in the event that the sender identification code associated with the message comprises the preset sender identification code, the client application corresponding to the preset sender identification code is identified as a client application that corresponds to the message.

In the event that the sender identification code associated with the message is a preset sender identification code, then the client application corresponding to the preset sender identification code is identified as the client application that corresponds to the message.

For example, a client device receives a message sent from the identification code 10086. The text of this message reads "Insufficient balance alert: Your telephone account balance is now below 10 dollars. Please promptly recharge to ensure normal use." The sender identification code of 10086 of the message is compared to a preset sender identification code list and is determined to match a preset sender identification code of 10086. Preset sender identification code of 10086 is indicated to correspond to the "Alipay" client application and therefore, the "Alipay" client application is identified as the client application that corresponds to the message.

In some embodiments, the techniques as described in process 300 of FIG. 3 and process 400 of FIG. 4 above may be combined in identifying a client application that corresponds to a message. FIG. 5, below, describes an example of such a combined process.

FIG. 5 is a flow diagram showing an example of a process for using information included in a message to identify a client application that corresponds to the message. In some embodiments, process 500 is implemented at system 100 of FIG. 1. In some embodiments, step 204 of process 200 of FIG. 2 can be implemented at least in part using process 500.

In some embodiments, process 500 can be implemented alternatively to process 300 of FIG. 3 or process 400 of FIG. 4.

At 502, it is determined whether a sender identification code associated with a message received at a client device comprises a preset sender identification code, wherein the preset sender identification code corresponds to a client application.

In some embodiments, a preset sender identification code and keywords list is predetermined and stored at the client device. The preset sender identification code and keywords list includes one or more preset sender identification codes, one or more keywords corresponding to each preset sender identification code, and a client application corresponding to each preset sender identification code. In some embodiments, the sender identification code of the message is compared against a preset sender identification code and keywords list to determine whether it is a preset sender identification code. As described above, the preset sender identification code corresponds to one or more keywords and also a client application.

At 504, in the event that the sender identification code associated with the message comprises the preset sender identification code, it is determined whether a keyword corresponding to the preset sender identification code is found in text content included in the message.

In some embodiments, each keyword corresponding to the matched preset sender identification code of the preset sender identification code and keywords list is compared to the text content of the message to determine whether that keyword can be found in the text content of the message.

At 506, in the event that the keyword is found in the text content included in the message, the client application corresponding to the preset sender identification code is identified as a client application that corresponds to the message.

If the keyword that corresponds to the matched preset sender identification code in the preset sender identification code and keywords list can also be found in the text content of the message, then the client application that corresponds to the matched preset sender identification code in the preset sender identification code and keywords list is identified as the client application that corresponds to the message.

For example, a client device receives a message sent from the identification code 10086. The text of this message reads "Insufficient balance alert: Your telephone account balance is now below 10 dollars. Please promptly recharge to ensure normal use." For example, using step 502, the sender identification code 10086 is first determined whether it matches a preset sender identification code from a preset sender identification code and keywords list. In the example, sender identification code of 10086 is determined to match a preset sender identification code. The matched preset sender identification code corresponds to a first client application. Process 500 then proceeds to step 504. At step 504, a keyword that corresponds to the matched preset sender identification code of 10086 is checked to determine whether the keyword can be found in the text content of the message. Specifically, the keywords "balance" and "recharge" corresponding to the matched preset sender identification code of 10086 can be acquired from the preset sender identification code and keywords list. The message can be checked to find out whether it includes at least one of the keywords "balance" and "recharge." The result of checking is that the message includes the corresponding keywords "balance" and "recharge." Process 500 then proceeds to step 506. At step 506, the client application that corresponds to the matched preset sender identification code is identified as the client application that corresponds to the message. For example, in the preset sender identification code and keywords list, the keywords corresponding to the matched preset sender identification code of 10086 are "balance" and "recharge" and the corresponding client application is the "Alipay" client application.

Figure 6:
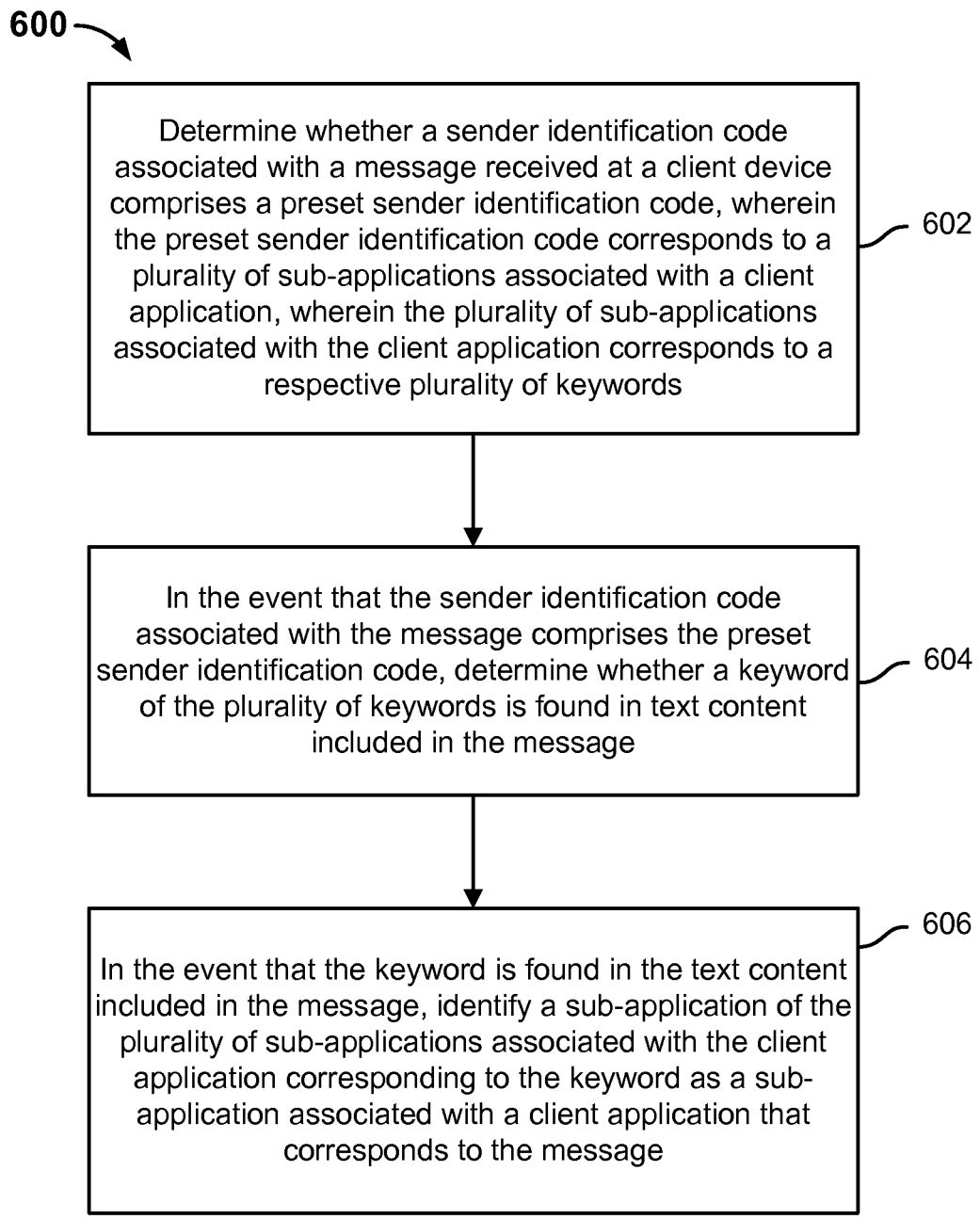
FIG. 6 is a flow diagram showing an example of a process for using information included in a message to identify a sub-application of a client application that corresponds to the message.

In some embodiments, where at least some client applications may each be configured to perform various different types of services (or include several sub-applications), a preset keyword list or a preset sender identification code and keywords list may further include the one or more sub-applications (of a client application) that correspond to each keyword and/or each preset sender identification code. When the client application that corresponds to the message is identified in either of process 300 of FIG. 3 or process 500 of FIG. 5 above, each process may further include: determining a sub-application associated with the client application that corresponds to the message. FIG. 6, below, shows an example process of using a preset sender identification code and keywords list that includes one or more sub-applications of a client application that correspond to each preset sender identification code to identify a particular sub-application of a client application that corresponds to a message.

FIG. 6 is a flow diagram showing an example of a process for using information included in a message to identify a sub-application of a client application that corresponds to the message. In some embodiments, process 600 is implemented at system 100 of FIG. 1. In some embodiments, step 204 of process 200 of FIG. 2 can be implemented at least in part using process 600.

Process 600 is similar to process 500 of FIG. 5 except the preset sender identification code and keywords list of process 600 additionally includes the one or more sub-applications (of a client application) that correspond to one or more respective keywords that correspond to each preset sender identification code.

In some embodiments, process 600 can be implemented alternatively to process 300 of FIG. 3, process 400 of FIG. 4, or process 500 of FIG. 5.

At 602, it is determined whether a sender identification code associated with a message received at a client device comprises a preset sender identification code, wherein the preset sender identification code corresponds to a plurality of sub-applications associated with a client application, wherein the plurality of sub-applications associated with the client application corresponds to a respective plurality of keywords.

In some embodiments, a preset sender identification code and keywords list is predetermined and stored at the client device. The preset sender identification code and keywords list indicates one or more preset sender identification codes, one or more keywords corresponding to each preset sender identification code and also one or more sub-applications (of a client application) that correspond to respective ones of the keywords that correspond to each preset sender identification code. In some embodiments, the sender identification code of the message is compared against a preset sender identification code and keywords list to determine whether it is a preset sender identification code. As described above, the preset sender identification code corresponds to one or more keywords and also one or more sub-applications of a client application.

To give an example, the terminal receives a message sent from the identification code 10086. The text of this message is "Insufficient balance alert: Your telephone account balance is now below 10 dollars. Please promptly recharge to ensure normal use."

At 604, in the event that the sender identification code associated with the message comprises the preset sender identification code, it is determined whether a keyword of the plurality of keywords is found in text content included in the message.

In some embodiments, each keyword included in the preset sender identification code and keywords list is compared to the text content of the message to determine whether that keyword can be found in the text content of the message. For example, a client application that is configured to perform payments may include the following sub-applications: transfer funds between accounts, perform a bill payment, perform a credit card payment, and transfer funds into a prepayment account (e.g., associated with a service, such as a phone account). For example, at least one keyword may be configured to correspond to each sub-application of a client application that corresponds to a preset sender identification code. For example, the keywords that can be configured to correspond to a phone account recharging sub-application are "recharging," "balance," and one or more other terms associated with phone account recharging, for example. The keywords that can be configured to correspond to a bill paying sub-application are "bill payment," "water bill," "electric bill," "fees owed," and one or more other terms associated with bill payment, for example. The keywords that can be configured to correspond to a credit card payment sub-application are "bill," "repayment," and one or more other terms associated with credit card repayment, for example.

Returning to the example above, the keywords of the preset sender identification code and keywords list that are associated with the matched preset sender identification code are compared to the text content of the message, and the keywords "balance" and "recharge" are found in the text content of the message.

At 606, in the event that the keyword is found in the text content included in the message, a sub-application of the plurality of sub-applications associated with the client application corresponding to the keyword is identified as a sub-application associated with a client application that corresponds to the message.

If a keyword that corresponds to the matched preset sender identification code in the preset sender identification code and keywords list can also be found in the text content of the message, then the sub-application of a client application that corresponds to that keyword in the preset sender identification code and keywords list is identified as the sub-application of the client application that corresponds to the message.

Returning to the example above, the sub-application of a client application configured to perform payments that corresponds to the keywords "balance" and "recharge" that were found in the text content of the message is the phone account recharging sub-application (the "Alipay Recharging" sub-app of the "Alipay" client application).

Figure 7:
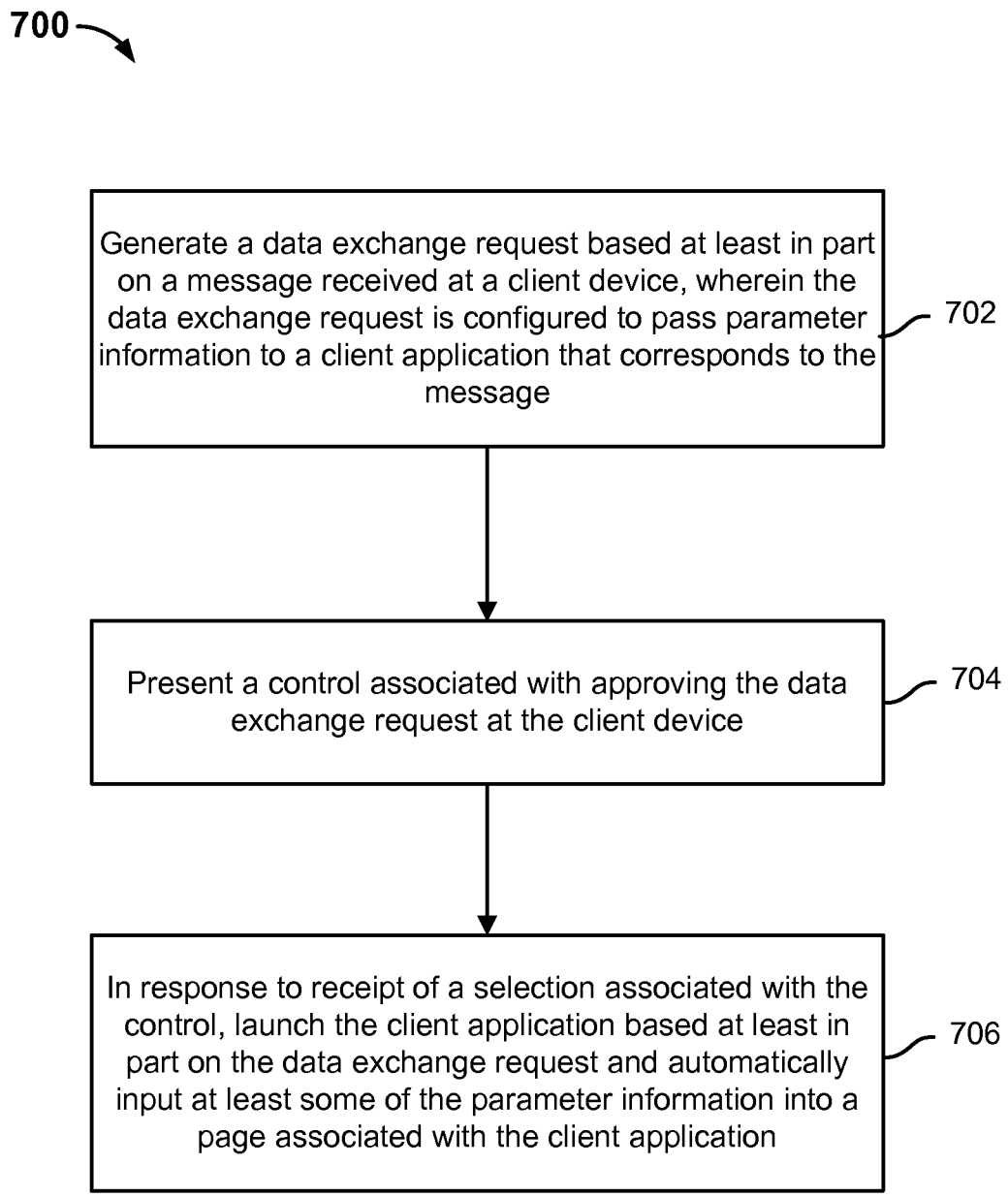
FIG. 7 is a flow diagram showing an example of a process of automatically launching a client application.

FIG. 7 is a flow diagram showing an example of a process of automatically launching a client application. In some embodiments, process 700 is implemented at system 100 of FIG. 1. In some embodiments, step 206 of process 200 of FIG. 2 can be implemented at least in part using process 700.

For example, prior to process 700, a client application that corresponds to a received message can be identified using one of process 300 of FIG. 3, process 400 of FIG. 4, process 500 of FIG. 5, and process 600 of FIG. 6.

At 702, a data exchange request is generated based at least in part on a message received at a client device, wherein the data exchange request is configured to pass parameter information to a client application that corresponds to the message.

Now that the client application or a particular sub-application of that client application that corresponds to the message has been determined, the client application is caused to perform an exchange of data (e.g., with a server) based on the message. The type of data exchange that the client application is caused to perform can be determined according to the keywords included in the text content of the message, and a data exchange request that requests the performance of a data exchange of this type is generated. In some embodiments, the type of data exchange can be determined based at least in part on the keywords corresponding to the client application and that are included in the message.

In a first example, a phone bill balance alert message (e.g., sent by a phone company) is received at the client device, and it is determined that the keywords "bill," "balance," and "recharge" from a preset keyword list are included in the text content of the message and that such keywords are associated with a phone recharging service (e.g., sub-application) of a client application that is configured to perform payments. Thus, the type of data exchange to be performed by the client application is determined to be related to phone account recharging, and a request is generated to use the payment client application to perform recharging of the user's phone account. In a second example, an alert message (e.g., send by a credit card-issuing bank or a water, electricity, or gas supply department) is received at the client device, and it is determined that the keywords "bill" and "repayment" from a preset keyword list are included in the text content of the message and that such keywords are associated with a credit card payment (e.g., sub-application) of a client application that is configured to perform payments. In the second example, it can be determined that the type of data exchange to be performed by the client application is credit card payment, and a request is generated to use the payment client application to perform the payment of a credit card bill.

In various embodiments, the data exchange request may include parameter information associated with the determined data exchange. In some embodiments, the parameter information can be placed in uniform resource locator (URL) form. In some embodiments, the parameter information included in a data exchange request may be determined from the information included in the message. As will be described below, the parameter information that is included in the data exchange request may be passed to the client application to complete at least some input fields. In some embodiments, the URL can be generated by the operating system of the client device. Once the data exchange request comprising the URL has been generated, the data exchange request can be used to launch the client application that corresponds to the message. For example, the URL of the data exchange request may include an identifier corresponding to the identified client application that corresponds to the message or the identifier corresponding to the identified particular sub-application of a client application that corresponds to the message.

In some embodiments, the parameter information is determined based on information that was extracted from the message. In some embodiments, the parameter information is extracted from the message by analyzing predetermined terms in the text content of the message. For example, phrases that indicate a particular meaning are identified in the message text content and then other terms in the message may be extracted relative to these phrases to use as parameter information. For example, the text content of a credit card payment alert message may include words such as "bill balance," "due and payable," and "minimum repayment." These words are generally followed by the amount due on the credit card bill. Therefore, a numeric value, which comprises the amount due information, following these words may be extracted and used as parameter information.

In some embodiments, the parameter information can also be extracted from the message by comparing the message to a preset sender message template. Alert messages are generally sent according to a corresponding template, which is fixed. For example, an insufficient phone account balance alert that corresponds to a payment client application and a credit card payment alert message that corresponds to a payment client application are generally both sent according to a corresponding fixed template. That is, the types of information and the positions of the information within a certain type of alert message that are sent to every user are usually the same. Only specific values (e.g., user name, outstanding balances, bank card number, etc.) in the alert messages may differ from message to message. In other words, among messages of the same type and that are sent by the same sender, the types of information included in the text content and the positions of the information of such messages sent to different users are the same; only specific values differ among messages sent to different users. For example, in a credit card payment alert message sent to credit card users by the same bank, the specific values such as the user name, card number, and credit card outstanding balances may differ, yet the positions of such values within the text of the message would be the same. Therefore, it is possible to pre-acquire templates of a sender's messages and to use them to determine the positions within the message template of the parameter information that is needed for data exchanges by a corresponding client application. It then becomes possible to use a template that has been acquired for a sender to extract the parameter information from a message that is sent by that sender.

In some embodiments, besides including information that is extracted from the message, the parameter information may include information that is stored by the client device. For example, such information may include a bank account number associated with the user of the client device, a phone number associated with the user of the client device, and an address of the user of the client device.

The following is an example URL that is included in a data exchanges request: abc://platformapi/startapp?appId=123&sourceId=654321&clientVersion=7.6.5.4&outTradeNo=xxxxxx&mobileNo=12345678912&cmsMsg=12345& returnUrl=654321, where "abc" is the identifier of the client application that is to be launched; "appId" represents the identifier of the sub-application of the client application that is to be directed to. As such, based on the data exchange request with the example URL above, client application abc can be launched and directed to its sub-application 123. The other example parameter information that is included in the example URL above includes, for example: mobileNo=12345678912, which indicates that the phone number in need of recharging its phone account is 12345678912.

At 704, a control associated with approving the data exchange request is presented at the client device.

Before the client application is launched with the data exchange request, a prompt is displayed at the client device that asks the user for permission to launch the client application that has been determined to correspond to the message. The prompt may include at least a control that comprises a selectable element that the user can select to indicate approval for the launch of the identified client application. The prompt may include an identifier associated with the client application to launch and/or other information. In some embodiments, the prompt is displayed at the same display page and/or application as the page and/or application at which the received message was displayed.

For example, assume that the keywords "balance" and "recharge" were included in the text content of an insufficient phone balance alert message and so a client application configured to perform payments is identified to correspond to the message. Because the identified type of data exchange to be performed by the payment client application is a phone recharging service (sub-application), a request to use the payment client application to carry out the phone recharging service is generated. For example, the data exchange request can be displayed in the form of a prompt or an icon on a display page of the message so as to alert the user to the need for recharging his or her phone account. When the user reads the message and learns that the balance of his or her phone is insufficient, the user may, if he or she wishes to proceed to recharge the phone account, select the control (e.g., a button) on the prompt or icon that approves of proceeding with the phone recharging service displayed at the message display page. In the event that the approval button on the prompt has been selected, the data exchange request is configured to be used to launch the payment client application to complete the phone recharging service. Put another way, when the user reads the message received by the client device, he or she needs only to select (e.g., click) to approve the data exchange request displayed at the display page of the message to directly skip to the (e.g., appropriate sub-application of the) client application that corresponds to the message to cause the client application to perform an appropriate type of service. There is no need for the user to manually exit from the message application or to switch to a client application. It is not even necessary for the user to select the sub-application of the client application corresponding to the message. The user can be guided directly to the appropriate sub-application of the client application to perform the type of service.

At 706, in response to receipt of a selection associated with the control, the client application is launched based at least in part on the data exchange request and at least some of the parameter information is automatically input into a page associated with the client application.

In various embodiments, "launching" a client application refers to opening/executing an unopened client application at the client device or continuing to execute a client application that was already opened/executed (but was not currently in use). Once the data exchange request is approved by the user, the data exchange request is configured to cause the identified client application to launch. As described above, the data exchange request includes parameter information that is to be passed to the launched client application. In some embodiments, the parameter information includes one or more of the following: identification information associated with a data exchange sender and identification information associated with the data exchange receiver (e.g., the user of the client device). The identification information associated with the data exchange sender may include, for example, information as the number (e.g., a sender identification code) of the sender, the account number of the client application, and the bank card account number associated with the sender. The identification information associated with the data exchange receiver may, for example, include the number of the receiver, the account number of the client application, and the bank card account number associated with the receiver. In some embodiments, the parameter information may further include one or more of the following: the identifier of a sub-application of a client application that corresponds to the message, this identifier being associated with the client application. For example, a client application may contain one or more sub-applications and each sub-application in the client application may have an identifier, such as a sub-application number, associated with that client application.

In some embodiments, the parameter information included in the data exchange request is used to prepopulate at least some of the input fields associated with a page of the launched client application. For example, the launched client application may be opened to a page that includes a form in which the data exchange data is to be input. For example, the launched payment client application may be opened to a page with a form in which information identifying a payee and an amount of money to send the payee is solicited via input fields. In some embodiments, the page to which the client application was opened is associated with a particular sub-application of the client application that was identified to correspond to the message. The input fields of the page of the client application are then prepopulated with the relevant parameter information that was passed to the client application via the data exchange request. For example, the parameter information is matched to the various input fields of the page of the client application based on their metadata. In some embodiments, the prepopulated page of the client application is displayed at the client device for the user to edit before selecting a selectable element to cause the client application to submit the input parameter information as part of a data exchange request to the server associated with the client application.

By automatically launching a client application that is relevant to a message and automatically passing information to the client application, input errors into the client application can also be avoided. In addition, before the user confirms an exchange of data with a server, he or she can modify information that has already been automatically prepopulated at the launched client application. For example, the user may, as needed, modify information such as account transfer amounts or bill payment amounts. If the information does not need to be modified, the user only has to carry out a few steps in accordance with prompts displayed by the client application on the exchange page to confirm the operation and complete the data exchange (e.g., complete the payment).

In some embodiments, before the user selects the selectable element to submit the information input at the page, the client application issues a request to a server associated with the client device's manufacturer for that server to create a data exchange record based on the data exchange request. The data exchange record based on the data exchange request can be associated with an identification code that is sent back by that server to the client device. When the identification code of the data exchange record sent back by the server is received, this identification code may also be placed in the data exchange request when it is ready to be sent to the server associated with the client application so that this data exchange record identification code can be another parameter that is sent with the data exchange parameter information described above to the client application server. Moreover, after the server associated with the client application successfully completes a data exchange, the server associated with the client server can send the data exchange result information (e.g., a confirmation that the payment was sent to the appropriate payee) according to the data exchange record identification code to the server associated with the client device's manufacturer so that the server associated with the client device's manufacturer can update the data exchange record in accordance with the result information.

For example, a request to create a data exchange record for this data exchange is sent to the backend server for the client device manufacturer so as to record at the client device manufacturer the data exchange conducted between the user of the client device and other users via the client application. Moreover, after the server associated with the client device manufacturer has created a data exchange record based on the request, the server associated with the client device manufacturer sends back a data exchange record identification code to the client application. This identification code can then be placed in a data exchange request that is transmitted by the client application to the client application's server.

After the data exchange is completed (e.g., a successful data exchange result information is received at the client device), the client application may display the successful data exchange result information on the client device to inform the user to the success of the data exchange. For example, the client application can display some of the data exchange parameter information, the time the data exchange was completed, and other such information. In some embodiments, a server associated with the client application can send data exchange result information according to the data exchange record identification code to the server associated with the client device's manufacturer so that the server associated with the client device's manufacturer can update the data exchange record according to the identification code and the result information. The server associated with the client device's manufacturer can then send the data exchange result information to the client device.

As described above, embodiments as described herein allow a message received by a client device to provide an interface (e.g., a prompt) for jumping to another client application. With this interface, it is possible for the user to jump from the message directly to the relevant client application (or a sub-application of the client application) corresponding to the message. The user does not need to manually exit the message and then activate the client application corresponding to the message. Furthermore, the user does not even need to select the appropriate sub-application of the client application or complete the input fields of the launched client application. This flow allows the user to conveniently perform tasks in response to receiving a message.

Figure 8:
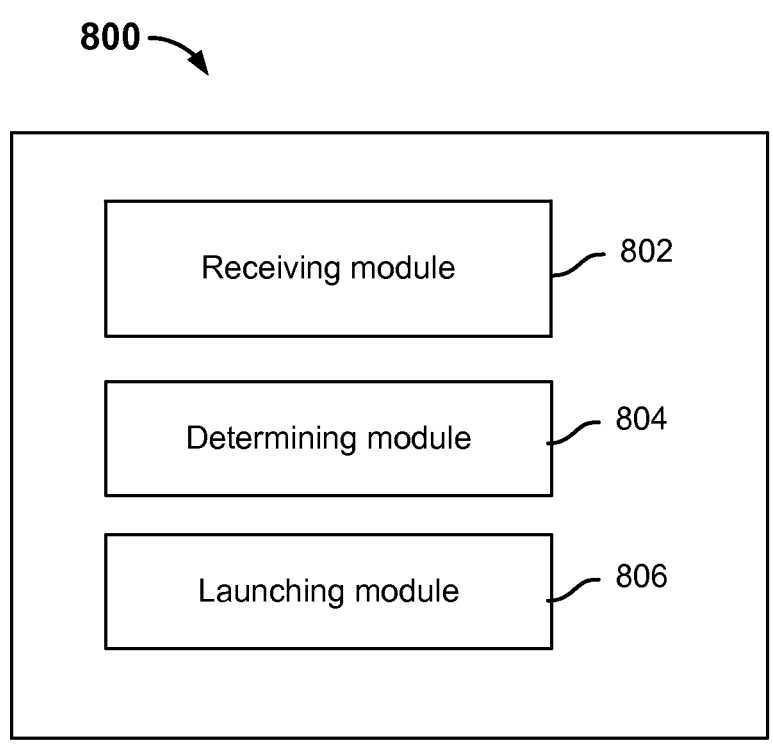
FIG. 8 is a diagram showing an embodiment of a system for launching a client application based on a received message.

FIG. 8 is a diagram showing an embodiment of a system for launching a client application based on a received message. In the example, system 800 includes receiving module 802, determining module 804, and launching module 806.

The modules and sub-modules can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

Receiving module 802 is configured to receive messages.

Determining module 804 is configured to use information included in the message to identify a client application that corresponds to the message.

Launching module 806 is configured to launch the client application. The client application is configured to receive at least some of the information included in the message. In some embodiments, the information of the message includes text content and/or a sender identification code.

In some embodiments, determining module 804 further includes: a first analyzing sub-module and a first determining sub-module.

The first analyzing sub-module is configured to analyze the text content of the message to determine whether the text content includes one or more keywords corresponding to a client application.

The first determining sub-module is configured to determine that the client application that corresponds to the keywords corresponds to the message if the text content of the message contains the keywords.

In some embodiments, determining module 804 further includes: a second querying sub-module and a second determining sub-module.

The second querying sub-module is configured to determine the sender identification code of the message and to determine whether it is a preset sender identification code.

The second determining sub-module is configured to determine that the client application that corresponds to the preset sender identification code corresponds to the message if the sender identification code of the message is the preset sender identification code.

In some embodiments, determining module 804 further includes: a third querying sub-module, a third analyzing sub-module, and a third determining sub-module.

The third querying sub-module is configured to determine the sender identification code of the message and to determine whether it is a preset sender identification code.

The third analyzing sub-module is configured to analyze the text content of the message to determine whether it includes keywords that correspond to the preset sender identification code if the sender identification code of the message is a preset sender identification code.

The third determining sub-module is configured to determine that the client application that corresponds to the preset sender identification code corresponds to the message if the text content of the message includes the keywords.

In some embodiments, system 800 may further comprise a generating module. If the corresponding function is a data exchange, then the generating module is configured to generate a data exchange request based on the message. The data exchange request is configured to cause the client application to complete the data exchange according to the data exchange request.

In some embodiments, the generating module is further configured to use the keywords included in the text content of the message to determine a type of data exchange and to generate a data exchange request requesting for that type of data exchange be performed. Moreover, the data exchange request includes parameter information that may have been at least extracted from the message. The parameter information includes one or more of the following: identification information associated with the data exchange sender and identification information associated with the data exchange receiver.

In some embodiments, system 800 may further include: a requesting module and an identification code receiving module. The requesting module is configured to issue to a server associated with a manufacturer of the client device a request to create a data exchange record based on the data exchange request. The identification code receiving module is configured to receive an identification code sent back by the server associated with a manufacturer of the client device associated with the data exchange record created based on the data exchange request. In some embodiments, the parameter information of the data exchange request may further comprise an identification code associated with the data exchange record.

In some embodiments, system 800 may further include a result information receiving module. The result information receiving module is configured to receive the data exchange result information sent by the server associated with a manufacturer of the client device, wherein the result information is sent by the server associated with the client application to the server associated with a manufacturer of the client device.

Figure 9:
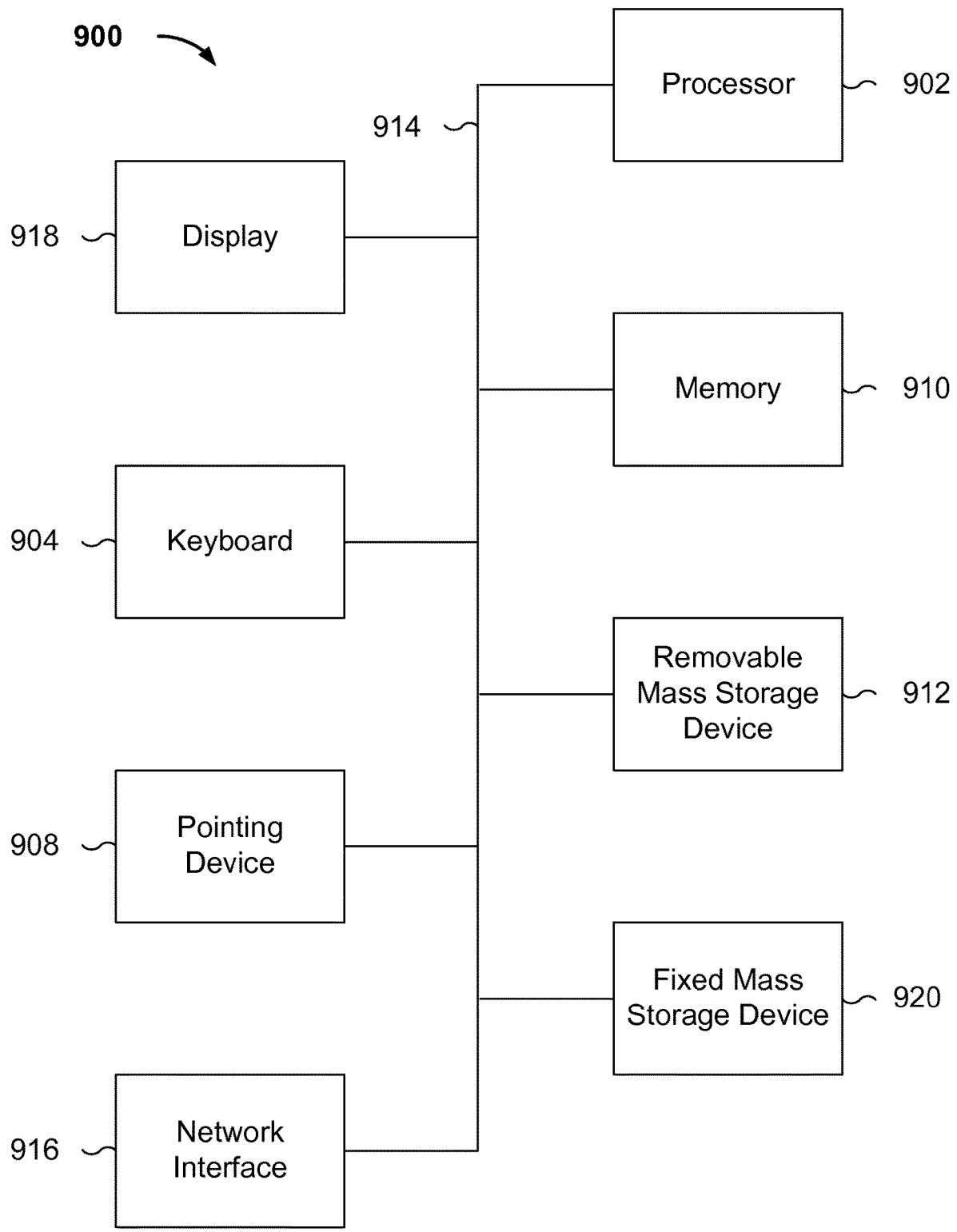
FIG. 9 is a functional diagram illustrating an embodiment of a programmed computer system for implementing the launching of a client application based on a message.

FIG. 9 is a functional diagram illustrating an embodiment of a programmed computer system for implementing the launching of a client application based on a message. As will be apparent, other computer system architectures and configurations can be used to launch a client application based on a message. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In some embodiments, processor 902 includes and/or is used to provide the launch of a client application based on a message.

Processor 902 is coupled bi-directionally with memory 910, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900 and is coupled either bi-directionally (read/write) or uni-directionally (read only) to processor 902. For example, storage 912 can also include computer readable media such as magnetic tape, flash memory, PC-CARDS, portable mass storage devices, holographic storage devices, and other storage devices. A fixed mass storage 920 can also, for example, provide additional data storage capacity. The most common example of fixed mass storage 920 is a hard disk drive. Mass storage 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display 918, a network interface 916, a keyboard 904, and a pointing device 908, as well as an auxiliary input/output device interface, a sound card, speakers, and other subsystems as needed. For example, the pointing device 908 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that the embodiment of the present application can be provided as methods, systems, or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

The above-described are merely embodiments of the present application and do not serve to limit the present application. For persons skilled in the art, the present application may have various alterations and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a predetermined list at a client device, wherein the predetermined list comprises a plurality of client applications corresponding to respective ones of a plurality of pieces of content;
determine a plurality of installed client applications at the client device;
compare the plurality of installed client applications to the plurality of client applications on the predetermined list to determine an identified client application that is not installed at the client device;
download the identified client application at the client device;
receive a message at the client device;
use information included in the message to determine the identified client application that corresponds to the message, wherein to use the information included in the message comprises to compare information associated with the message to the predetermined list, wherein to use the information included in the message to identify the identified client application that corresponds to the message comprises to:
determine that the message comprises at least a first keyword and a second keyword;
in response to a determination that the message comprises at least the first keyword and the second keyword, use a mapping of keywords to applications to determine that a combination of the first keyword and a second keyword included in the message corresponds to the identified client application included in the plurality of client applications; and
in response to a determination that the combination of the first keyword and the second identified client application corresponds to the message, automatically launch the identified client application, wherein the identified client application is configured to receive at least some of the information included in the message, wherein to automatically launch the identified client application comprises to:
determine, based at least in part on one or more pieces of information extracted from the message, a page in the identified client application with which the message is associated, the page comprising a form to which information is to be submitted;
launch the identified client application to present the page associated with the identified client application with which the message is associated, wherein the one or more pieces of information extracted from the message are prepopulated into corresponding one or more input fields of the form;
present a control configured to obtain a selection for submission of the one or more pieces of information in the form by executing the identified client application; and
in response to receiving the selection via the control, submit the prepopulated one or more of pieces of information to execute the identified client application; and
a memory coupled to the processor and configured to provide the processor with instructions.

2. The system of claim 1, wherein to compare the information associated with the message to the predetermined list includes to:
determine whether a keyword from a preset keyword list is found in text content included in the message, wherein the preset keyword list indicates that the identified client application corresponds to the keyword; and
in response to a determination that the keyword is found in the text content included in the message, identify the identified client application that corresponds to the keyword as indicated by the preset keyword list as the identified client application that corresponds to the message.

3. The system of claim 1, wherein to compare the information associated with the message to the predetermined list includes to:
determine whether a sender identification code associated with the message comprises a preset sender identification code, wherein the preset sender identification code corresponds to the identified client application; and
in response to a determination that the sender identification code associated with the message comprises the preset sender identification code, identify the identified client application corresponding to the preset sender identification code as the identified client application that corresponds to the message.

4. The system of claim 1, wherein to compare the information associated with the message to the predetermined list includes to:
determine whether a sender identification code associated with the message comprises a preset sender identification code, wherein the preset sender identification code corresponds to the identified client application;
in response to a determination that the sender identification code associated with the message comprises the preset sender identification code, determine whether a keyword corresponding to the preset sender identification code is found in text content included in the message; and
in response to a determination that the keyword is found in the text content included in the message, identify the identified client application corresponding to the preset sender identification code as the identified client application that corresponds to the message.

5. The system of claim 1, wherein to use the information included in the message to identify the identified client application that corresponds to the message includes to identify a sub-application associated with the identified client application that corresponds to the message.

6. The system of claim 5, wherein to identify the sub-application associated with the identified client application that corresponds to the message includes to:
determine whether a sender identification code associated with the message comprises a preset sender identification code, wherein the preset sender identification code corresponds to a plurality of sub-applications associated with the identified client application, wherein the plurality of sub-applications associated with the identified client application corresponds to a respective plurality of keywords;

in response to a determination that the sender identification code associated with the message comprises the preset sender identification code, determine whether a keyword of the plurality of keywords is found in text content included in the message; and in response to a determination that the keyword is found in the text content included in the message, identify the sub-application of the plurality of sub-applications associated with the identified client application corresponding to the keyword as the sub-application associated with the identified client application that corresponds to the message.

7. The system of claim 1, wherein the one or more pieces of information are extracted from the message based at least in part on comparing the message to a preset message template.

8. The system of claim 1, wherein the one or more pieces of information comprise a uniform resource locator (URL).

9. The system of claim 1, wherein the processor is further to:

receive a user selection to submit the at least some of the one or more pieces of information prepopulated into the corresponding one or more input fields of the form in the page associated with the identified client application; and in response to the user selection, send the at least some of the one or more pieces of information prepopulated into the corresponding one or more input fields of the form in the page associated with the identified client application to a server.

10. A method, comprising:

receiving a predetermined list at a client device, wherein the predetermined list comprises a plurality of client applications corresponding to respective ones of a plurality of pieces of content;

determining a plurality of installed client applications at the client device;

comparing the plurality of installed client applications to the plurality of client applications on the predetermined list to determine an identified client application that is not installed at the client device;

downloading the identified client application at the client device;

receiving a message at the client device;

using information included in the message to determine the identified client application that corresponds to the message, wherein using the information included in the message comprises comparing information associated with the message to the predetermined list, wherein using the information included in the message to identify the identified client application that corresponds to the message comprises:

determining that the message comprises at least a first keyword and a second keyword;

in response to a determination that the message comprises at least the first keyword and the second keyword, using a mapping of keywords to determine that a combination of the first keyword and a second keyword included in the message corresponds to the identified client application included in the plurality of client applications; and in response to a determination that the identified client application corresponds to the message, automatically launching, using one or more processors, the identified client application, wherein the identified client application is configured to receive at least some of the information included in the message, wherein automatically launching the identified client application comprises:

determining, based at least in part on one or more pieces of information extracted from the message, a page in the identified client application with which the message is associated, the page comprising a form to which information is to be submitted;

launching the identified client application to present a form in a page associated with the identified client application with which the message is associated, wherein the one or more pieces of information extracted from the message are prepopulated into corresponding one or more input fields of the form;

presenting a control configured to obtain a selection for submission of the one or more pieces of information in the form by executing the identified client application; and in response to receiving the selection via the control, submitting the prepopulated one or more of pieces of information to execute the identified client application.

11. The method of claim 10, wherein comparing the information associated with the message to the predetermined list includes:

determining whether a keyword from a preset keyword list is found in text content included in the message, wherein the preset keyword list indicates that the identified client application corresponds to the keyword; and in response to a determination that the keyword is found in the text content included in the message, identifying the identified client application that corresponds to the keyword as indicated by the preset keyword list as the identified client application that corresponds to the message.

12. The method of claim 10, wherein comparing the information associated with the message to the predetermined list includes:

determining whether a sender identification code associated with the message comprises a preset sender identification code, wherein the preset sender identification code corresponds to the identified client application; and in response to a determination that the sender identification code associated with the message comprises the preset sender identification code, identifying the identified client application corresponding to the preset sender identification code as the identified client application that corresponds to the message.

13. The method of claim 10, wherein comparing the information associated with the message to the predetermined list includes:

determining whether a sender identification code associated with the message comprises a preset sender identification code, wherein the preset sender identification code corresponds to the identified client application;

in response to a determination that the sender identification code associated with the message comprises the preset sender identification code, determining whether a keyword corresponding to the preset sender identification code is found in text content included in the message; and in response to a determination that the keyword is found in the text content included in the message, identifying the identified client application corresponding to the preset sender identification code as the identified client application that corresponds to the message.

14. The method of claim 10, wherein using the information included in the message to identify the identified client application that corresponds to the message includes identifying a sub-application associated with the identified client application that corresponds to the message.

15. The method of claim 14, wherein identifying the sub-application associated with the identified client application that corresponds to the message includes:
   determining whether a sender identification code associated with the message comprises a preset sender identification code, wherein the preset sender identification code corresponds to a plurality of sub-applications associated with the identified client application, wherein the plurality of sub-applications associated with the identified client application corresponds to a respective plurality of keywords;
   in response to a determination that the sender identification code associated with the message comprises the preset sender identification code, determining whether a keyword of the plurality of keywords is found in text content included in the message; and
   in response to a determination that the keyword is found in the text content included in the message, identifying the sub-application of the plurality of sub-applications associated with the identified client application corresponding to the keyword as the sub-application associated with the identified client application that corresponds to the message.

16. A computer program product, the computer program product comprising a non-transitory computer readable storage medium and comprising computer instructions for:
   receiving a predetermined list at a client device, wherein the predetermined list comprises a plurality of client applications corresponding to respective ones of a plurality of pieces of content;
   determining a plurality of installed client applications at the client device;
   comparing the plurality of installed client applications to the plurality of client applications on the predetermined list to determine an identified client application that is not installed at the client device;
   downloading the identified client application at the client device;
   receiving a message at the client device;
   using information included in the message to determine the identified client application that corresponds to the message, wherein using the information included in the message comprises comparing information associated with the message to the predetermined list, wherein using the information included in the message to identify the identified client application that corresponds to the message comprises:
      determining that the message comprises at least a first keyword and a second keyword;
      in response to a determination that the message comprises at least the first keyword and the second keyword, using a mapping of keywords to determine that a combination of the first keyword and a second keyword included in the message corresponds to the identified client application included in the plurality of client applications; and
   in response to a determination that the identified client application corresponds to the message, automatically launching the identified client application, wherein the identified client application is configured to receive at least some of the information included in the message, wherein automatically launching the identified client application comprises:
      determining, based at least in part on one or more pieces of information extracted from the message, a page in the identified client application with which the message is associated, the page comprising a form to which information is to be submitted;
      launching the identified client application to present the page associated with the identified client application with which the message is associated, wherein the one or more pieces of information extracted from the message are prepopulated into corresponding one or more input fields of the form;
      presenting a control configured to obtain a selection for submission of the one or more pieces of information in the form by executing the identified client application; and
      in response to receiving the selection via the control, submitting the prepopulated one or more of pieces of information to execute the identified client application.

17. The system of claim 1, wherein the identified client application comprises one or more of the following: a payment client application, a phone account balance recharging service client application, and a stocks client application.

18. The system of claim 1, wherein to launch the identified application to present the page associated with the identified client application in a manner in which the one or more pieces of information extracted from the message are prepopulated into the form does not require manual input or selection from a user of the system.

19. The system of claim 1, wherein the processor is further configured to, in response to a determination that the first keyword and the second keyword are respectively mapped to a plurality of applications or sub-applications, determine that the identified client application corresponds to the message based at least in part on the identified client application being mapped to a greatest number of keywords comprised in the message compared to other installed client applications.

20. The system of claim 1, wherein the identified client application is determined to correspond to the message based at least in part on a number of keywords that are comprised in the message and to which the identified client application is mapped exceeding a preset threshold.

* * * * *